US008934774B2

(12) United States Patent
Yi et al.

(10) Patent No.: US 8,934,774 B2
(45) Date of Patent: Jan. 13, 2015

(54) PHASE SHIFTER AND PHOTONIC CONTROLLED BEAM FORMER FOR PHASED ARRAY ANTENNAS

(75) Inventors: Xiaoke Yi, Sydney (AU); Thomas Huang, Sydney (AU); Robert Minasian, Sydney (AU)

(73) Assignee: The University of Sydney (AU)

( * ) Notice: Subject to any disclaimer, the term of this patent is extended or adjusted under 35 U.S.C. 154(b) by 0 days.

(21) Appl. No.: 13/582,675

(22) PCT Filed: Mar. 2, 2011

(86) PCT No.: PCT/AU2011/000228
§ 371 (c)(1), (2), (4) Date: Sep. 4, 2012

(87) PCT Pub. No.: WO2011/106831
PCT Pub. Date: Sep. 9, 2011

(65) Prior Publication Data

US 2012/0328298 A1 Dec. 27, 2012

(30) Foreign Application Priority Data

Mar. 2, 2010 (AU) ................................ 2010900871

(51) Int. Cl.
*H04J 14/02* (2006.01)
*H04J 14/08* (2006.01)
*H04B 10/00* (2013.01)
*H01Q 3/26* (2006.01)

(52) U.S. Cl.
CPC .................................. *H01Q 3/2676* (2013.01)
USPC .............................. 398/96; 398/103; 398/135

(58) Field of Classification Search
CPC .... H04B 10/116; H04B 10/114; H04B 10/01; H04B 2210/006
USPC .......................................... 398/96, 135, 103
See application file for complete search history.

(56) References Cited

U.S. PATENT DOCUMENTS

| | | | | |
|---|---|---|---|---|
| 8,055,140 | B2 * | 11/2011 | Vassilieva et al. ............ | 398/210 |
| 2003/0198477 | A1 * | 10/2003 | Kuri et al. ..................... | 398/183 |
| 2007/0206958 | A1 * | 9/2007 | Chen et al. .................... | 398/183 |

(Continued)

OTHER PUBLICATIONS

International Search Report for PCT Application No. PCT/AU2011/000228; mailed May 12, 2011; 2 pages.

*Primary Examiner* — David Payne
*Assistant Examiner* — Pranesh Barua
(74) *Attorney, Agent, or Firm* — Hiscock & Barclay, LLP

(57) ABSTRACT

A beam forming antenna device emitting a predetermined free space energy pattern, the device including: an optical signal source having predetermined wavelength characteristics; an optical modulator for modulating predetermined wavelengths of the optical signal source to produce a modulated signal source including frequency sideband components; a dispersion element for spreading and projecting the modulated signal source in a wavelength dependant manner onto a relative phase manipulation element; a relative phase manipulation element manipulating the relative phase of the modulated signal source in a predetermined manner, said phase manipulation element further amplitude modulating predetermined wavelengths of said modulated signal source and outputting a predetermined groupings of wavelengths on a series of output ports; optical to electrical conversion means converting the amplitude of the optical signal on said output ports to a corresponding electrical signal; and a series of irradiating antenna elements connected to each corresponding electrical signal for radiating a corresponding free space signal to substantially produce said predetermined free space energy pattern.

15 Claims, 12 Drawing Sheets

Topology of optically controlled beamforming network

(56) References Cited

U.S. PATENT DOCUMENTS

2008/0316585 A1* 12/2008 Cohen et al. .................. 359/303
2009/0027268 A1 1/2009 Coward
2009/0052909 A1* 2/2009 Hino et al. .................... 398/200
2009/0232510 A1* 9/2009 Gupta et al. .................. 398/136

* cited by examiner

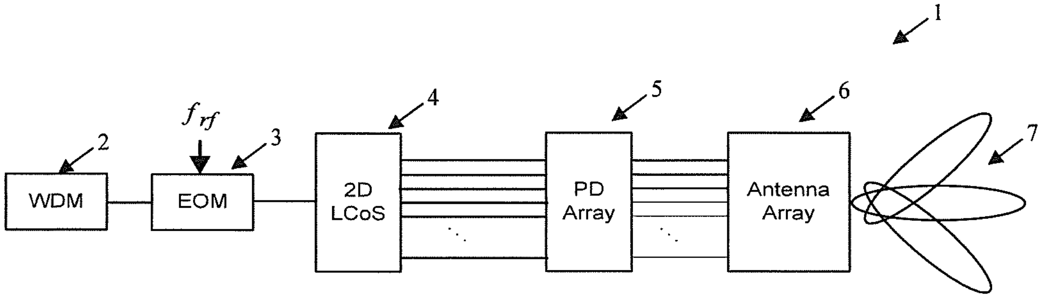
Fig.1. Topology of optically controlled beamforming network
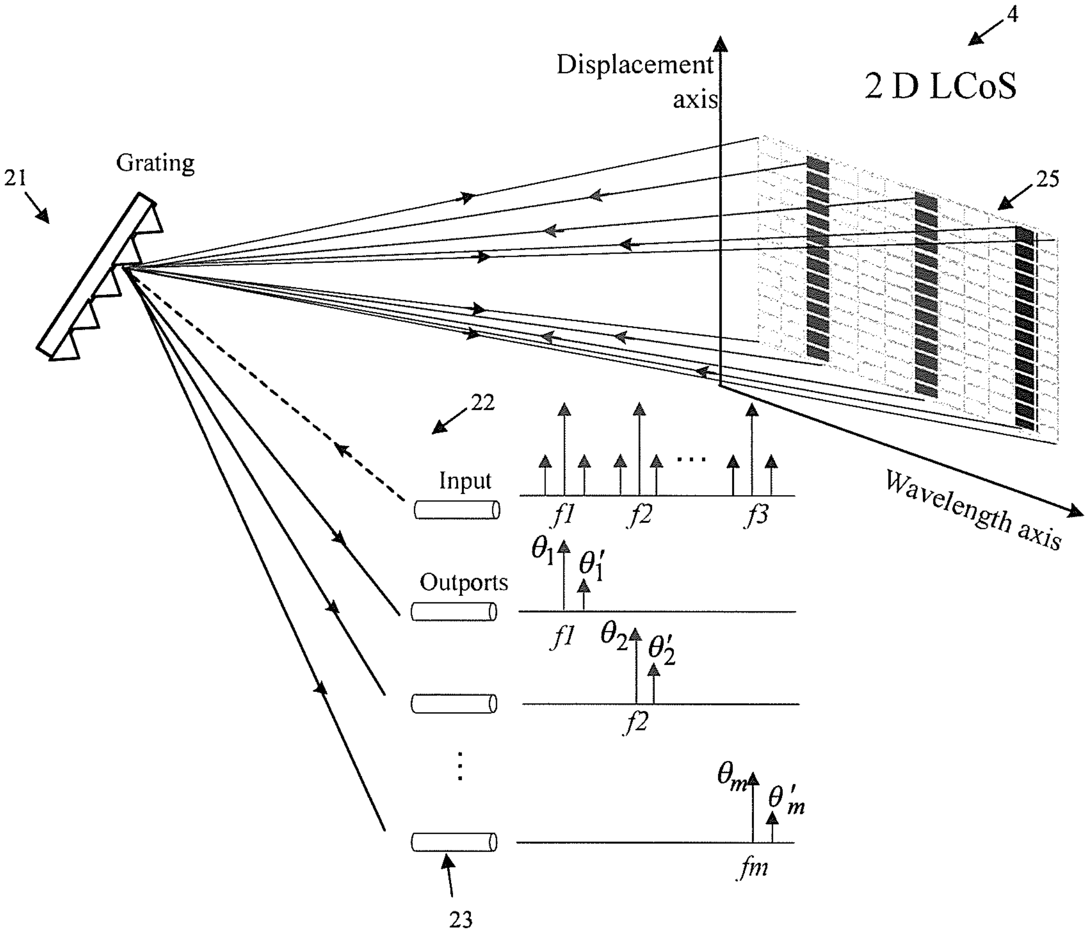
Fig 2

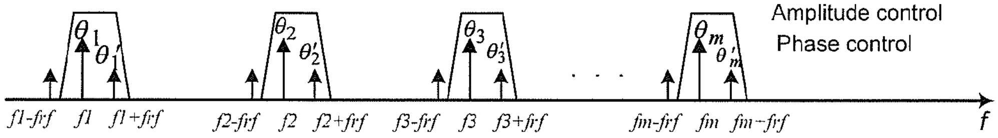
Fig. 3
Experiments
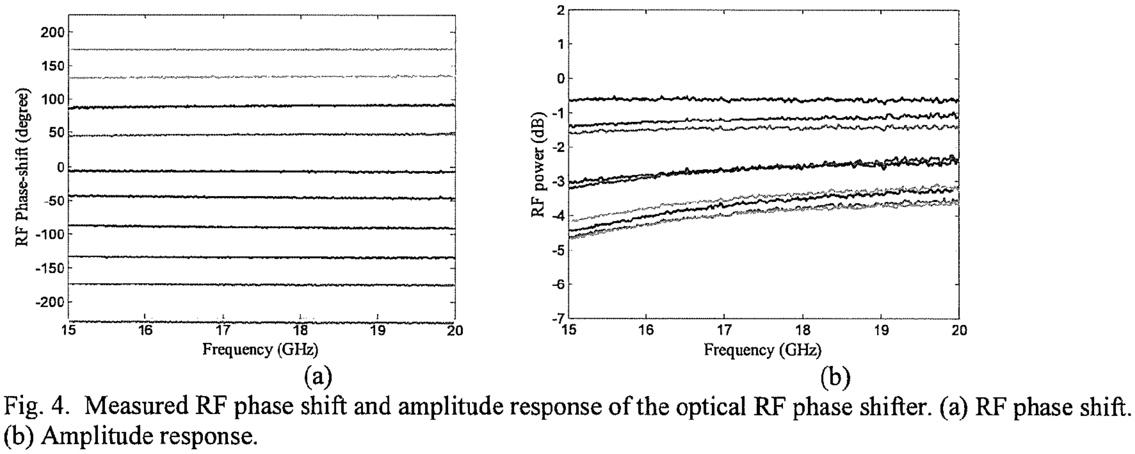
Fig. 4. Measured RF phase shift and amplitude response of the optical RF phase shifter. (a) RF phase shift. (b) Amplitude response.

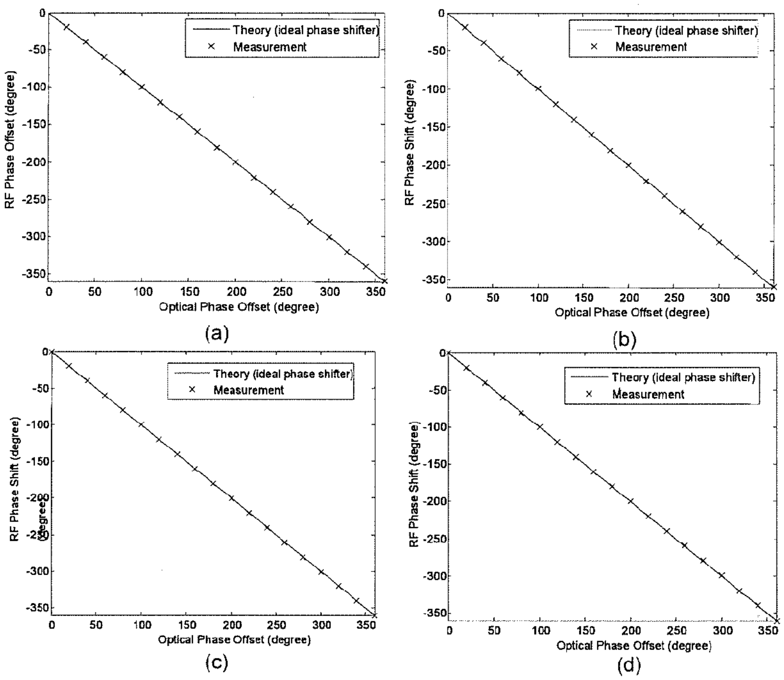
Figure 5 Measured RF phase shift at the output of the photonic RF phase shifter at a single frequency of 17GHz. The phase shifter was operated at different optical wavelengths (a) 1549.413nm, (b)1550.37nm, (c)1551.38nm and (d)1552.35nm.

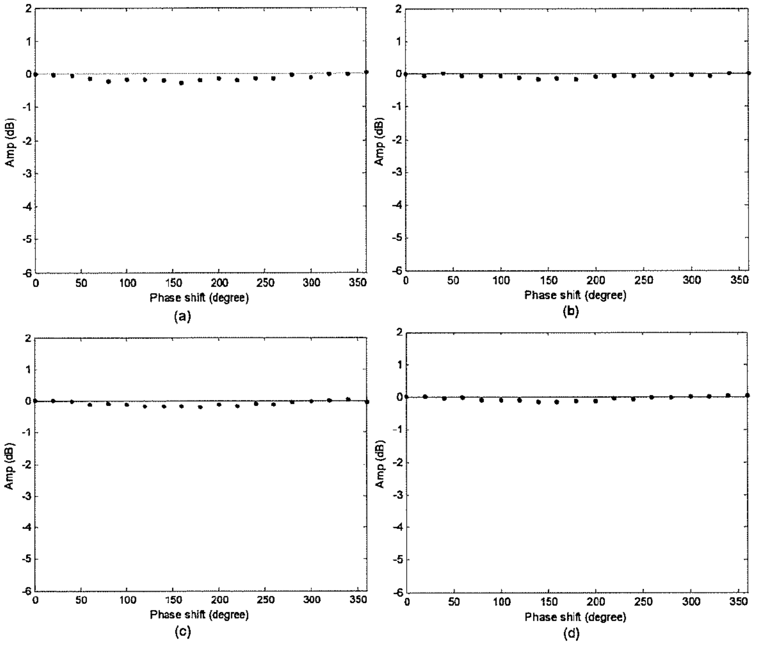
Figure 6 Measured variations in the output RF signal power of the phase shifter at a single frequency of 17GHz. The phase shifter was operated at different optical wavelengths (a) 1549.413nm, (b)1550.37nm, (c)1551.38nm and (d)1552.35nm.

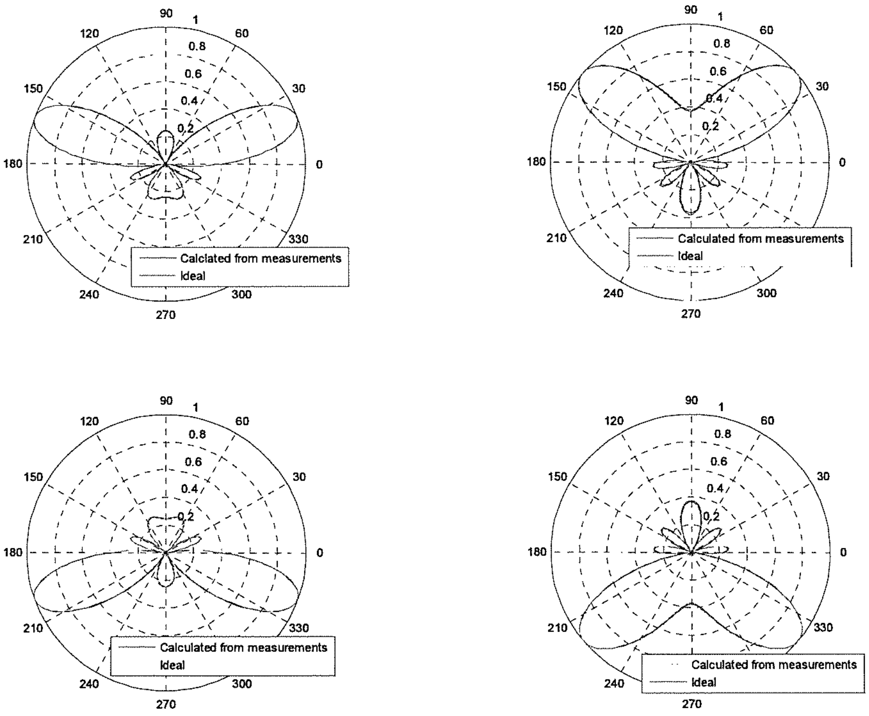
Figure 7 Calculated array factors for a linear 4 elements PAA optical beamforming feeder, in which phase and amplitude controllers are measured at 17 GHz. Scanning angle is specified at a) 20 degrees, b) 40 degrees, c) -20 degrees, d) -40 degrees.

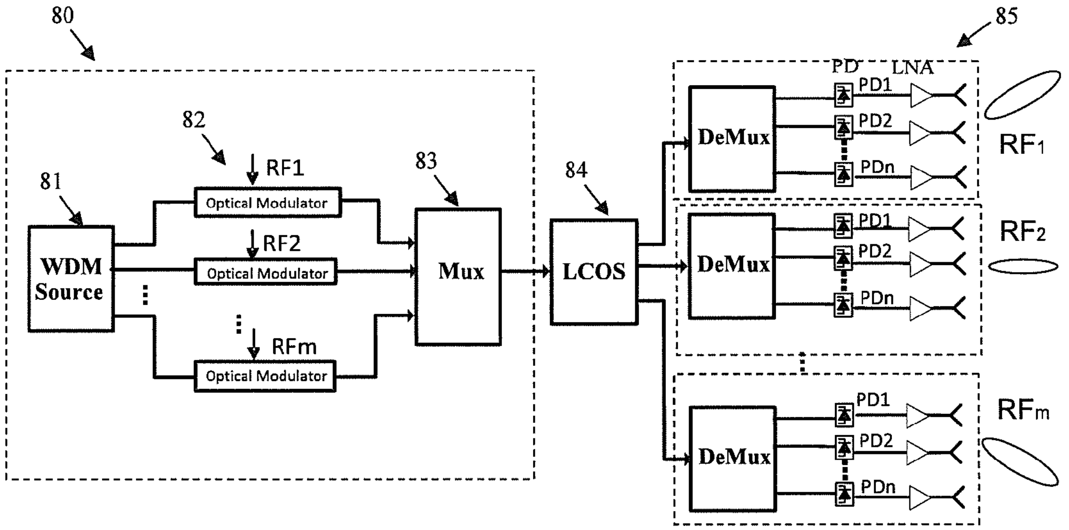
Fig. 8. Multi-beam structure 1
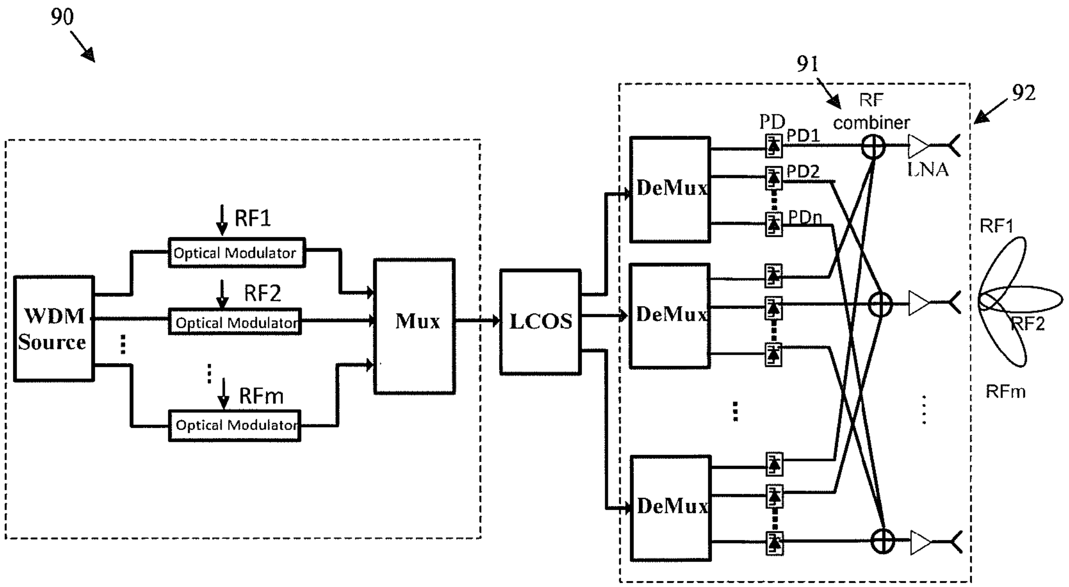
Fig. 9. Multi-beam structure 2

Fig. 12 Wavelength reuse structure 2

PHASE SHIFTER AND PHOTONIC CONTROLLED BEAM FORMER FOR PHASED ARRAY ANTENNAS

CROSS REFERENCE TO RELATED APPLICATION

This application is a national stage application of International Application No. PCT/AU2011/000228, filed Mar. 2, 2011, which claims priority upon Australian Patent Application No. 2010900871, filed Mar. 2, 2010, the entire contents of each application herein being incorporated by reference.

FIELD OF THE INVENTION

The present invention relates to phase shifting devices and beam forming arrays for electromagnetic irradiation and, in particular, discloses a beamforming array for radio frequency signals utilising a photonic control system.

BACKGROUND

Any discussion of the prior art throughout the specification should in no way be considered as an admission that such prior art is widely known or forms part of common general knowledge in the field.

Phased array antenna devices comprise a group of radiating elements that are fed by relative phases of the respective microwave signals. Its radiation pattern can be electrically steered by changing the relative phases of the signals without mechanically moving the antenna, which has been found many applications due to its agility and reliability. Recently, there has been an increasing attention applied to optically controlled beamforming techniques. For example, see Stulemeijer, F. E. van Vliet, K. W. Benoist, D. H. P. Maat, and M. K. Smit, "Compact photonic integrated phase and amplitude controller for phased-array antennas," IEEE Photonics Technology Letters, vol. 11, pp. 122-124, January 1999.

Utilising photonic technologies in the construction of phased array antennas has advantages such as a wide bandwidth, low loss, compact size, remote antenna feeding and immunity to electromagnetic interference. In many radar and satellite communication systems that do not require large bandwidths, the phase shift phased array beamforming network is desirable because it has a compact architecture and elegant layout.

A significant element in photonic beamformers is a wideband photonic microwave phase shifter, which is required to have independent and continuous phase controls ranging from 0 to $2\pi$ for each array element with a satisfactory phase accuracy. It is also preferable to be constructed with all-optical methods to fully exploit the capacity of photonics without limitations of electronics.

SUMMARY OF THE INVENTION

It is an object of the present invention to provide an improved photonic controlled beam former for phased array antennas and an associated phase shifter.

In accordance with a first aspect of the present invention, there is provided a beam forming antenna device emitting a predetermined free space energy pattern, the device including: an optical signal source having predetermined wavelength characteristics; an optical modulator for modulating predetermined wavelengths of the optical signal source to produce a modulated signal source including frequency sideband components; a dispersion element for spreading and projecting the modulated signal source in a wavelength dependant manner onto a relative phase manipulation element; a relative phase manipulation element manipulating the relative phase of the modulated signal source in a predetermined manner, the phase manipulation element further amplitude modulating predetermined wavelengths of the modulated signal source and outputting a predetermined groupings of wavelengths on a series of output ports; optical to electrical conversion means converting the amplitude of the optical signal on the output ports to a corresponding electrical signal; a series of irradiating antenna elements connected to each corresponding electrical signal for radiating a corresponding free space signal to substantially produce the predetermined free space energy pattern.

The relative phase manipulation element can comprise a liquid crystal array element having a series of independently controllable pixels for providing the relative phase manipulation.

The phase manipulation element substantially attenuates the lower side bands of the frequency sideband components.

The phase manipulation element wherein the groupings are preferably provided by means of a phase grating structure providing directional projection of predetermined frequencies to predetermined output ports.

In accordance with another aspect of the present invention, there is provided a beam forming antenna device emitting a plurality of predetermined directional free space energy patterns, the device including: an optical source emitting a series of optical signals at predetermined wavelengths; a series of optical modulators having one of a series of Radio Frequency modulation inputs, said modulators, modulating the optical signals to produce a plurality of modulated output signals; a wavelength processing unit, having a series of unit inputs and unit output, including: a optical spreader system spreading said plurality of modulated output signals spatially by signal number and frequency onto a planar processing array; a planar processing array, processing the spreaded series of signals, mapping each frequency of each signal to a predetermined output port with a predetermined phase relationship to other frequencies mapped to the same output port; for each output port: a demultiplexer for extracting and separating a series of frequency ranges from an output port producing a series of frequency specific demultiplexer outputs; and a series of conversion units, converting each of the frequency specific demultiplexer outputs to corresponding electrical signal; a series of emitters for emitting corresponding radiation patterns to the electrical signals, so as to thereby produce said plurality of predetermined directional free space energy patterns.

In some embodiments for each output port, the corresponding electrical signals of each of said series of frequency ranges are combined and one emitter is provided for emitting the corresponding radiation pattern for each of the combined frequency ranges. In other embodiments, each optical modulator modulates substantially all the predetermined wavelengths and said wavelength processing unit separates predetermined modulated wavelengths to output on predetermined output ports.

In accordance with a further aspect of the present invention, there is provided a method of forming a directionally focused electromagnetic radiation pattern, the method comprising the steps of: (a) inputting an optical input signal source having predetermined wavelength characteristics; (b) modulating the optical input signal source with an electromagnetic frequency source to produce a modulated optical signal; (c) dispersing the modulated optical signal in a wavelength dependant manner to produce a wavelength dispersed modulated signal; (d) manipulating the relative phase of adjacent wavelengths of the wavelength dispersed modulated signal in a predetermined manner to impart a relative phase delay to different wavelengths of the dispersed modulated signal, to create a phase manipulated dispersed modulated signal; (e) simultaneously mapping different portions of the phase manipulated dispersed modulated signal to one of a series of predetermined optical output signals; (f) for each optical output signal, converting the optical signal to a corresponding amplitude signal and applying the amplitude signal to an antenna element for transmission as said antenna output signal; whereby, in combination, the transmitted antenna output signals form said directionally focused electromagnetic radiation pattern.

In accordance with a further aspect of the present invention, there is provided a phase shifter device, the device including: an optical signal source having predetermined wavelength characteristics; an optical modulator for modulating predetermined wavelengths of the optical signal source to produce a modulated signal source including frequency sideband components; a dispersion element for spreading and projecting the modulated signal source in a wavelength dependant manner onto a relative phase manipulation element; and a relative phase manipulation element manipulating the relative phase of the modulated signal source in a predetermined manner, said phase manipulation element further amplitude modulating predetermined wavelengths of said modulated signal source and outputting a predetermined groupings of wavelengths on a series of output ports.

Preferably, the relative phase of the optical signal source and its frequency sideband components is set utilizing the relative phase manipulation element.

BRIEF DESCRIPTION OF THE DRAWINGS

Benefits and advantages of the present invention will become apparent to those skilled in the art to which this invention relates from the subsequent description of exemplary embodiments and the appended claims, taken in conjunction with the accompanying drawings, in which:

FIG. 1 illustrates schematically the arrangement of the preferred embodiment;

FIG. 2 illustrates schematically the operation of the LCoS device;

FIG. 3 illustrates the band pass filtering of the LCoS device;

FIG. 4 illustrates measured RF phase shifts and amplitude response of the optical RF phase shifter;

FIG. 5 illustrates the measured RF phase shift at a single frequency;

FIG. 6 illustrates the measured variations in the output RF signal power of the phase shifter at a single frequency;

FIG. 7 illustrates calculated array factors for a linear 4 elements PAA optical beamforming feeder;

FIG. 8 illustrates schematically the arrangement of the embodiment with a multi-beam configuration;

FIG. 9 illustrates schematically the arrangement of an embodiment with an alternative multi-beam configuration;

DETAILED DESCRIPTION OF THE PREFERRED AND OTHER EMBODIMENTS

Figure 10:
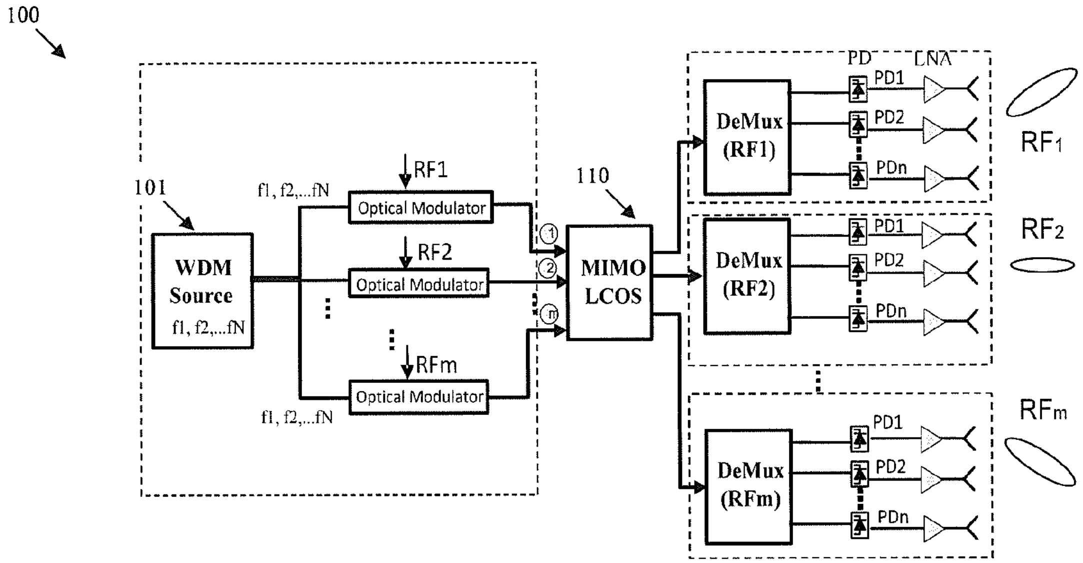
FIG. 10 illustrates schematically the arrangement of an embodiment with a wavelength reuse multi-beam configuration.

Preferred embodiments of the invention will now be described, by way of example only, with reference to the accompanying drawings.

In the preferred embodiment, there is provided a new optically controlled beamforming network that has simple configuration and elegant layout, and can be constructed from readily available optical components. The beamforming device also includes phase shifters providing microwave phase shifting capabilities.

The preferred embodiment relies upon utilization of multiple wideband photonic microwave phase shifters achieved by applying advanced phase patterns on a two-dimensional (2D) array of liquid crystal on silicon (LCoS) pixels. A suitable device for utilisation in LCoS switching is disclosed in G. Baxter, S. Frisken, D. Abakoumov, H. Zhou, I. Clarke, A. Bartos, and S. Poole, "Highly programmable wavelength selective switch based on liquid crystal on silicon switching elements," in Opt. Fiber Commun. Conf., Anaheim, Calif., OTuF2., 2006, in addition to United States Patent Applications 20060098156 and 20060193556, the contents of each of which are incorporated by cross-reference.

The described LCoS arrangements are highly flexible and completely reconfigurable because the radiation pattern possesses a complete freedom from the limitation on the number of achievable scanning beam angles due to the continuous and independent microwave phase shifts performed by each programmable photonic phase shifter that constitutes the array. Utilising a LCoS array provides for an all-optical approach, which can fully exploit wide bandwidth and low loss photonics. An additional advantage of the structure is that the amplitude control is inherently incorporated in the network so that array phase taper and array amplitude taper can be implemented simultaneously therefore the complexity in the structure is reduced as additional array weighting elements are not necessary.

Topology and Principle—Single Beam Arrangement

The topology of the novel optically controlled beamformer is illustrated 1 in FIG. 1. It is comprised of a multi-wavelength source 2 providing a series of wavelength independent optical signals, an electro-optic modulator (EOM) 3 modulates each of the inputs, a spectral phase processor 4 is provided based on a 2D array of LCoS pixels and a set of photodetectors 5 that are connected to the radiating elements with the transformed photodetection signal utilised to drive each of the radiating elements to provide output signal 7.

The multi-wavelength continuous wave signal from WDM 2 is intensity modulated by an RF signal via the EOM 3. The output signal from EOM 3 is sent through the LCoS device 4.

The operation of the LCoS device 4 is shown schematically in FIG. 2. The input signal undergoes a wavelength dependant dispersion in a first axis via grating 21. The wavelength dispersed output is elongated in the orthogonal direction by a lensing network (not shown) and projected onto an LCoS device 25. As disclosed in the aforementioned references, through manipulation of the LCoS pixels, a virtual grating structure is created within LCoS 25. The virtual grating structure results in a controlled projection of the output direction and relative phase of the reflected light. The reflected light of different wavelengths is recombined by grating 21 and directed to one of a series of output ports e.g. 23, depending on the reflection grating structure dynamically created by the LCoS device.

The diffraction grating 21 and associated imaging optics disperses and images different spectral wavelength of the modulated light on to a different portion of the LCoS horizontally. Then a specifically calculated phase modulation pattern is applied between adjacent columns of the LCoS along the horizontal axis through a voltage dependent retardation of liquid crystal pixels. This results in the creation of respective optical phase offsets between carrier and the two sidebands of each wavelength. Meantime, another optical phase pattern for amplitude and output direction control is applied to the rows of LCoS along the vertical axis to pass through each wavelength carrier and its upper sideband to the desirable fibre output port but to completely attenuate its lower sideband by steering it to a discard output port.

Returning to FIG. 1, the outputs of the LCoS device 4 are then detected by an array of photodetectors 5 that convert the optical signals to corresponding microwave phase shifted signals and amplifications that route to the radiation elements of the antenna array 6.

As the LCoS device disperses the wavelength spectral components in the horizontal direction, horizontal relative optical phase modulation can be configured to allow the optical phase offset of individual optical carrier and its sideband to be controlled independently in the complete 0 to 2π range. Vertical manipulation can result in the filtering out of the lower sideband. The attenuations of the carrier and its upper sideband can be programmed by setting the vertical optical phase pattern onto the device. The band pass nature of the LCoS operation is illustrated in FIG. 3.

To discuss the operation of the system more formally, consider a continuous wave with a single optical frequency f and output optical power P, modulated by a RF signal with modulation frequency $f_{rf}$. The output optical field of the EOM 3 will be given by $$E(t) \propto \sqrt{P}\left(e^{j2\pi ft} + \frac{m}{4}e^{j2\pi(f+frf)t} + \frac{m}{4}e^{j2\pi(f-frf)t}\right) \quad (1)$$

where m is the small modulation index.

After processing by the LCoS device, the lower sideband of the modulated signal is assumed to be attenuated almost completely. Meanwhile, the optical amplitude and phase of the carrier and the upper sideband which pass through the device are controlled through advance phase patterns on the 2D LCoS device, as described before. Therefore, the optical field at the output of the LCoS can be expressed by $$E(t) \propto \sqrt{\varepsilon P}\left(e^{j(2\pi ft+\theta)} + \frac{m}{4}e^{j2\pi((f+frf)t+\theta')}\right) \quad (2)$$

where θ and θ' are the phase shifts to the optical carrier (ω) and the sideband ($f+f_{rf}$) due to the phase image on the horizontal portion of the LCoS device, and $\epsilon_i$ is the control factor of the optical power introduced by controlling the amplitude of the modulated optical signal via the vertical portions of the LCoS device.

After photodetection, the output microwave signal is given by $$I \propto \epsilon P \cos(2\pi f_{rf} + \alpha) \quad (3)$$

where εP is the resultant RF amplitude, and the optical carrier and its upper sideband phase difference (α=θ'−θ) becomes the microwave phase shift (α), which shows the optical power, and optical phase difference between the carrier and the sideband are directly translated to the conveyed RF signal.

The structure provides a programmable photonic microwave phase shifter which can be individually controlled in the entire 0 to 2π range. Another interesting feature is that the RF amplitude control is incorporated in to the phase shifter as given by εP in equation (3). The programmable phase shifter provides a controllable phase shift between one signal and another and, as such has many uses outside of beamforming.

The above equations apply for a single wavelength/frequency. The equations can be readily extended from the single wavelength derivation to a large array due to the parallel processing capability of the LCoS device accommodating different wavelength components that can be processed independently.

The network can simultaneously obtain multiple phased array elements with programmable phase and amplitude tapers without the complexity of adding weighting elements. Hence the angle of electromagnetic radiation can be continuously independently steered according to the respective phase taper along the radiating elements and its radiation pattern can be reconfigured according to the amplitude tapers.

In one simplified embodiment, a WDM source was constructed by an array of four lasers with wavelengths at 1549.413 nm, 1550.37 nm, 1551.38 nm, 1552.35 nm. The output of WDM source was followed by an EOM, biased at the quadrature point. The modulated signals were processed by advanced phase patterns onto a 2D LCoS, which was programmed to eliminate one lower sideband, to assign appropriate optical phases and amplitudes to the optical carriers and the remaining sideband, and to route the signals to the desirable output fibre ports. The output microwave signals with the respective RF phase shifts were then obtained after the photodiodes.

Initially, an investigation was undertaken to obtain a frequency-independent RF phase-shift for a wideband operation. By sweeping the microwave signals modulating the continuous wave (at 1550.37 nm), we obtained the phase shift of the recovered microwave signal and the amplitude response of the RF phase shifter, which were measured by a vector network analyzer. FIG. 4 shows a measured microwave phase shifter at 1550.37 nm. Different RF phase shift values are achieved by setting different horizontal optical phase modulation images (corresponding to 0 to 2π degrees optical phase offset between the carrier and its upper sideband) to the device to control the relative optical phase of the carrier and its sideband. It can be seen that the RF phase shift of the microwave signal is directly conveyed. FIG. 4(*b*) shows the measured amplitude response of the phase shifter by keeping the vertical phase modulation image. It shows that as we program the phase-shift only, the amplitudes of the recovered RF signal are modified. In our design, this modification can be compensated by adjusting the optical power at the wavelength via applying a vertical phase pattern without changing any parts of the structure. Therefore both the phase shift and amplitude response can be independent of the microwave frequency, confirming the wideband operation of the phase shifter.

Secondly, the optical phase translation at each wavelength, 1549.41 nm, 1550.37 nm, 1551.38 nm and 1552.35 nm respectively was measured. The network was programmed to establish phase and amplitude controls on four modulated signals instead of one. Calibration data on phase and amplitude controls are also applied. Then measured RF phase shift at the output vs. optical phase shift specified by the phase patterns on LCoS is observed at frequency of 17 GHz and the results for four wavelength channels at four different output ports are presented in FIG. 5. The phase results match well the idea case with error limited only within 2 degree.

Similarly, the corresponding RF output power vs. optical phase shift is also measured and the variations in the output RF signal power of the phase shifter is presented in FIG. 6. Those results show an excellent agreement between measurements and ideal phase shifters, with errors limited within 0.5 dB.

The radiation patterns of a 4-element phased array antenna were investigated based on the measured phases and amplitudes of respective four microwave phase shifters. The beam steering was obtained by appropriately programming respective optical phase shift in the structure and the amplitude is kept uniform across each element for simplicity. The simulated results show beam steering from −40 degree to 40 degree, based on the amplitude and phase measured in FIG. 5 and FIG. 6. As showed in FIG. 7, the calculated array factors are shown for a linear 4 elements PAA optical beamforming feeder, in which phase and amplitude controllers are measured at 17 GHz. Scanning angle were specified at a) 20 degrees, b) 40 degrees, c) −20 degrees, d) −40 degrees.

Many alternative embodiments are possible. For example, where different modulation formats are required, then the LCoS device can be reprogrammed to manipulate the sidebands in a predetermined manner. The following cases are examples:

a) For optical signals with double sideband amplitude modulation, the lower/upper sideband can be attenuated and the phase function can control the relative phase between the upper/lower sideband and the carrier.

b) For optical signal with double sideband amplitude modulation, two optical sidebands can also be provided with the opposite sign and the same magnitude optical phase shift relative to that of the carrier.

c) For optical signal with single sideband amplitude modulation, the phase control function can be used to control the relative phase between the sideband and the carrier.

d) For a phase modulated optical signal, different optical phase shifts are applied to the upper sideband and lower sideband which initially have a 180 degree phase difference. Therefore the resultant optical phase difference between the upper sideband and the carrier is the same magnitude but opposite sign as the optical phase difference between the lower sideband and the carrier. Thus, optical RF phase shifters can be formed after photodetection with an RF phase shift equivalent to the phase difference between that of the sideband and the carrier.

Multi-Beam Configuration

The arrangement of FIG. 1 can also be extended to Multi Beam configurations. A first example multibeam structure is illustrated 80 in FIG. 8. In this arrangement, the configuration of the multi-beam structure is comprised of a WDM source 81 outputting a series of m different optical wavelength, m optical modulators 82 that perform electrical to optical signal conversion of m RF signals inputs corresponding to the m beams (in some embodiments, the RF signals can be identical). Each RF input (RF1, RF2, . . . RFm) has a distinguished set of wavelengths from the WDM source to modulate and then the modulated signals are passed to LCOS 84 to be processed in a parallel manner (the same as described in the single beam case). The set of processed wavelength corresponding to RF1 are separately switched to a demultiplexer, DeMux (RF1) that separates each wavelength to its destined photodiode. A similar process is carried out for each of the other signals RF2 . . . RFm. The entire process forms a series of multi-beam operations.

The arrangement of FIG. 8 has a large number of radiating antennas. The number of radiating antennas can be reduced in other embodiments. In FIG. 9, an alternative arrangement is illustrated 90. In this arrangement, a series of RF combiners 91 are utilised to combine each set of signals for output 92. Each antenna outputs a corresponding signal for each RF input.

Wavelength Reuse Configuration

A further multi wavelength system is illustrated 100 in FIG. 10. The arrangement of FIG. 10 illustrates a beamforming network based on a wavelength reuse scheme in which one wavelength component is used for the transmission of separate signals on multiple antenna array elements. In this example, an optical source 101 with N different wavelengths/frequencies (optical frequencies f1, f2, . . . fN), is modulated by RF signals (RF1, RF2 . . . . RFm), and then the modulated outputs are sent to a multiple input and multiple out (MIMO) 2D LCoS. Here, a large scale 2D LCoS is divided into multiple areas. Each area processes one of RF signals carried by the same set of optical wavelengths.

Figure 11:
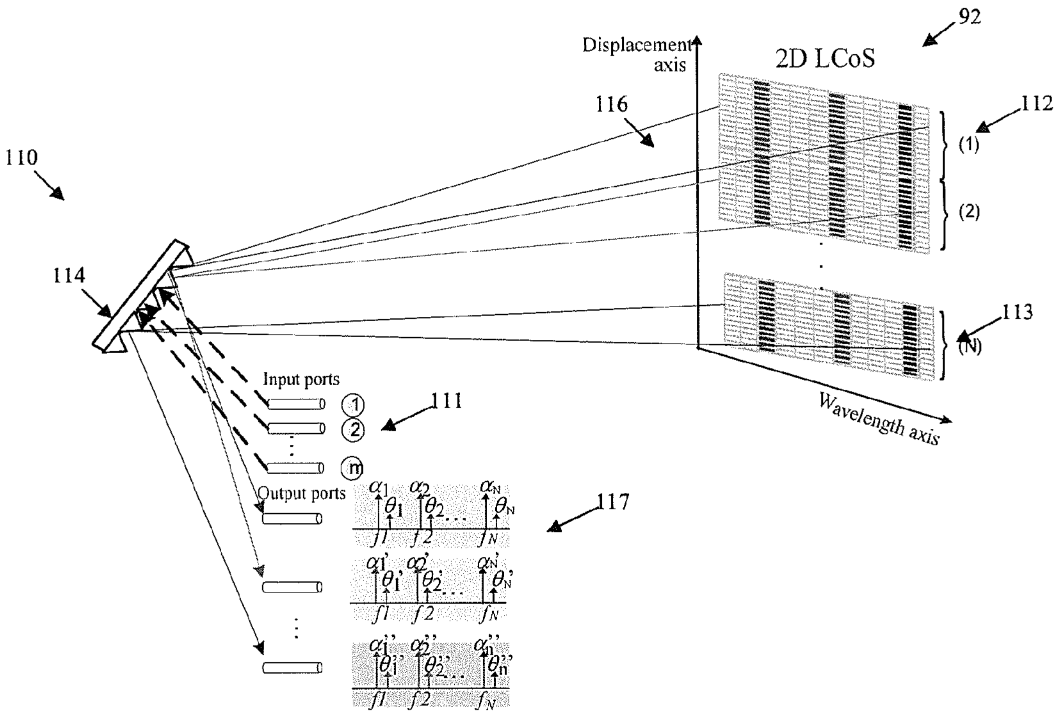
FIG. 11 illustrates schematically the operation of the MIMO LCoS device.

One example MIMO LCoS is illustrated schematically in FIG. 11. In this arrangement, the input ports 111 are projected via grating 114 and lensing system (not shown), onto 2D LCoS device 116. Each area e.g. 112 is utilised to map the input port frequencies and phases in a controlled manner to the output ports 117. Similar to the single beam case, spectral processing is obtained by applying advanced phase front images to the light dispersed from the diffraction grating and to realize narrow bandwidth optical filtering to select the carrier and one sideband only, and to impart any optical phase control on the spectral components at the same time. The processed optical single is directed to a corresponding output port 117.

Returning to FIG. 10, a demultiplexer DeMux(RF1) is used to separate each wavelength to its destined photodiode. Similarly, the outputs RF2, RF3 . . . RFm are also processed and directed to output port 2, 3 and port m respectively.

Figure 12:
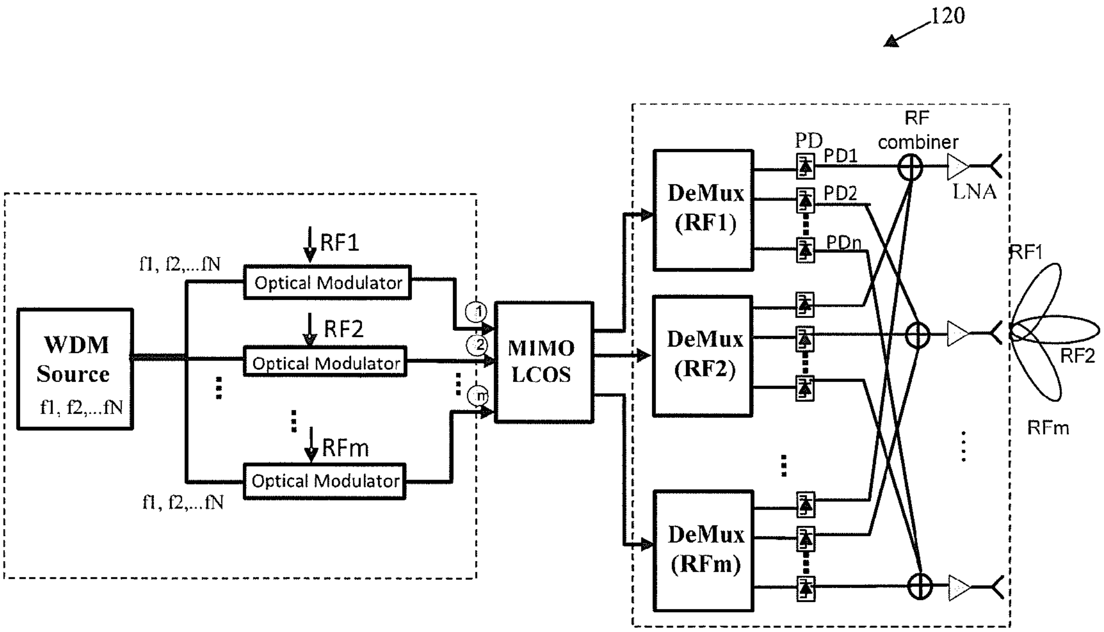
FIG. 12 illustrates schematically the arrangement of the embodiment with an alternative wavelength reuse multi-beam configuration

The structure of FIG. 10 can be extended to an alternative configuration shown 120 in FIG. 12. In this arrangement, there is only one set of radiators required, however additional RF combiners are needed.

In this new beamforming network based on a wavelength reuse scheme, one wavelength component corresponds to multiple antenna array elements. This significantly reduces the system's complexity. Moreover, the MIMO 2D LCoS technique enables multiple beam-forming, incorporated with adaptive beam-forming, which provide more flexible benefits in wireless and mobile communication systems. Additionally, the structure only needs optical sources with fixed wavelengths, and is compatible with different optical modulation formats including double sideband amplitude modulation, phase modulation and single sideband modulation.

Wavelength Reuse—Experimental Results

Figure 13:
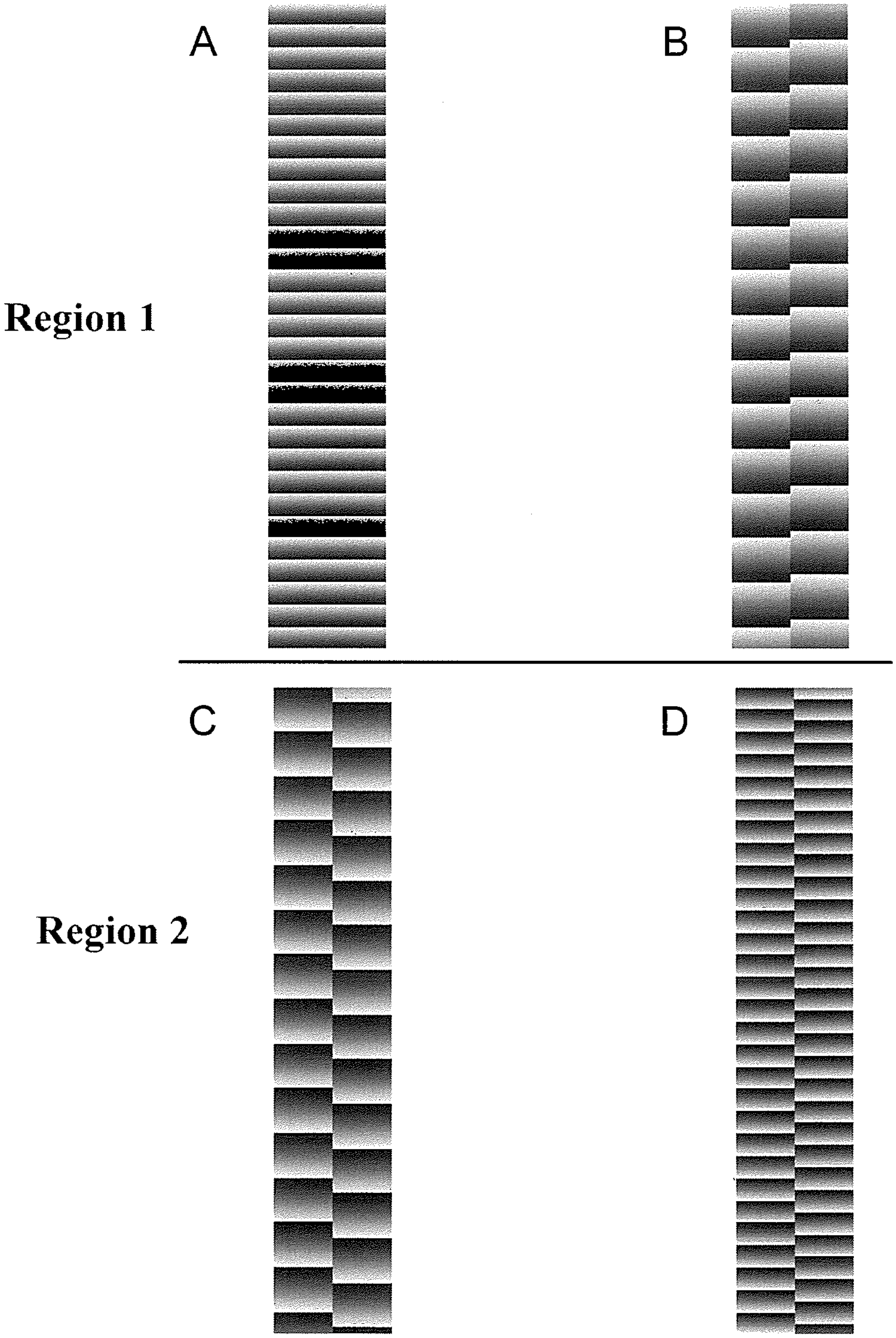
FIG. 13 illustrates an example projected phase pattern on an LCoS device for wavelength reuse with four microwave phase shifters.

A series of wavelength reuse experiments were carried out. FIG. 13 shows the phase grating structure produced on the LCoS of FIG. 12 for four photonic microwave phase shifters, which are achieved using two optical frequencies ($f_1$ and $f_2$) modulating an single-sideband (SSB) modulator at 40 GHz microwave signal. Phase shifter A and C correspond to the SSB modulated optical frequency $f_1$ while phase shifter B and D are realized from the SSB modulated optical frequency $f_2$ The example of FIG. 13 illustrates a one wavelength to two phase shifter mapping scheme, and it effectively doubles the number of array elements that can be obtained from a set of wavelength sources. The 2D LCoS is required to be programmed with phase patterns in order to provide two necessary functionalities: (i) wavelength switching to the correct output fiber, and (ii) Fourier shaping of the spectral component of the modulated signal. Output switching is realized by profiling the vertical phase pattern on the LCoS while Fourier shaping is achieved by designing the horizontal phase pattern on the LCoS. It is assumed that four sample fibers placed at the output switch angles for phase shifters (A, B, C and D) be −0.8°, −0.4°, 0.4° and 0.8° respectively. The horizontal pixels are programmed to impart step phase information to the carrier and signal of the modulated signal, with the beating at the photodiode translating the optical phase to the microwave phase (A with microwave t phase shift 0°, B with −6.56°, C with −123.12° and D with 174.86°).

The number of photonic microwave phase shifters determines the resolution of the phased array antenna as well as the realization of multiple beam operations for multi-beam configurations. By using the wavelength reuse scheme in the design, e.g. with a reuse factor of 4, the maximum number of phase shifters that can be realized by the photonic beam former is multiplied by 4.

40GHz and Wideband Operation

Figure 14:
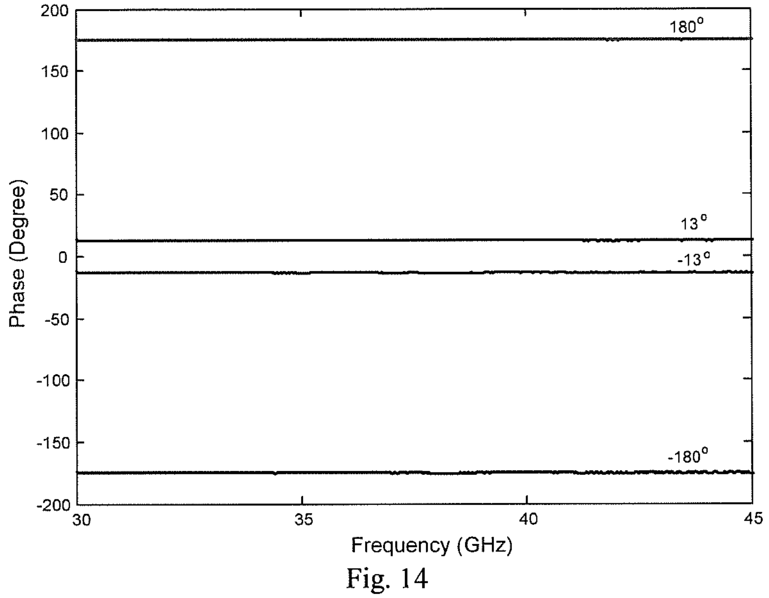
FIG. 14 illustrates a first set of resultant measured phase shifts.
Figure 15:
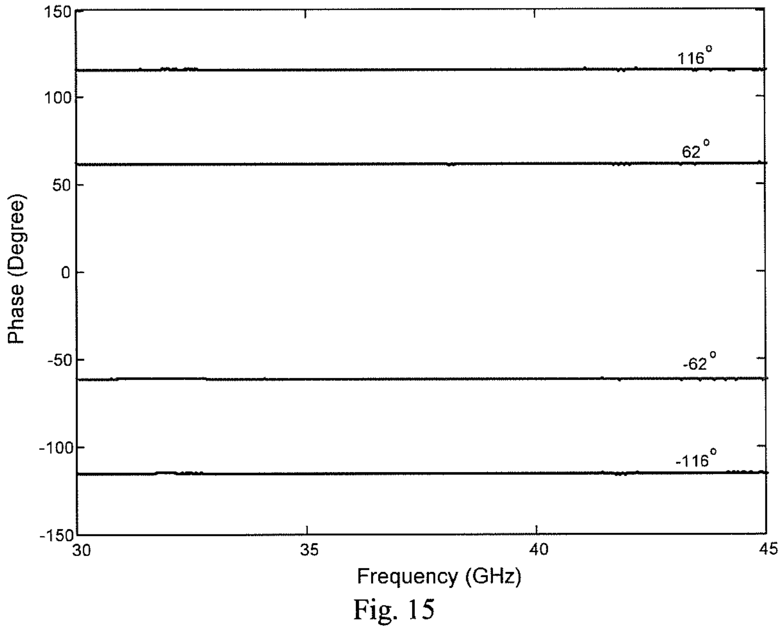
FIG. 15 illustrates a second set of resultant measured phase shifts.

The preferred embodiments allow the broadband phase shifter to operate at a ultra high frequency eg 40 GHz with a full range of phase controls of the photonic beam forming. FIG. 14 and FIG. 15 show the measured microwave phase shifts achieved where different phase shifts were achieved by software programming the phase profiles of 2D LCoS pixels to set the relative phase of the carrier and one sideband of the SSB modulated signal.

Multiple Wavelengths

Figure 16:
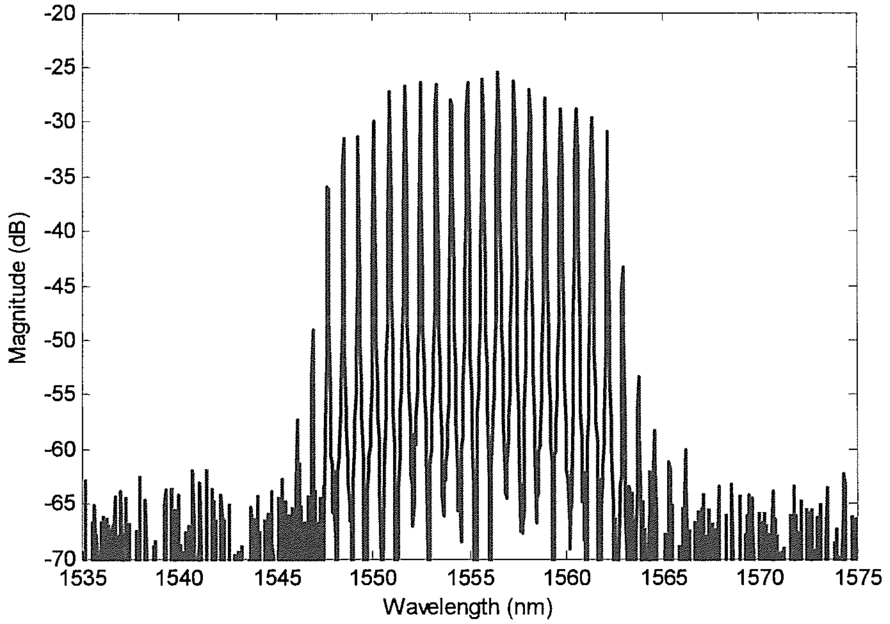
FIG. 16 illustrates a first measured optical spectrum using EDFA-based fiber laser.
Figure 17:
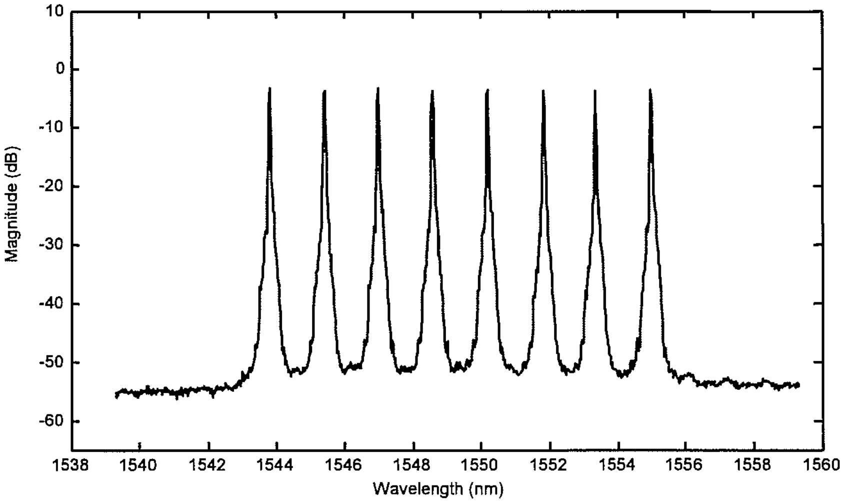
FIG. 17 illustrates a second measured optical spectrum using a laser array.

Embodiments of the invention can be utilized with different input optical sources. The optical source with predetermined wavelength characteristics can be realized by using different methods. FIG. 16 illustrates the wavelength characteristics of a first experimental multi-wavelength light source based on a fiber laser. FIG. 17 illustrates an input array of DFB lasers.

Figure 18:
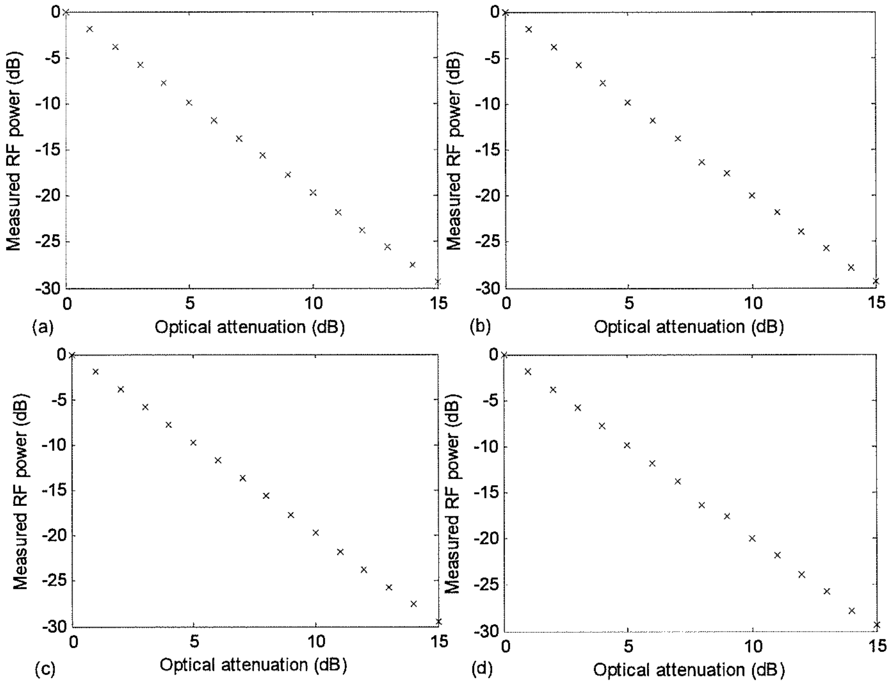
FIG. 18 illustrates measured levels of attenuation utilising a phase shifter.

As a result of the individual power adjustment characteristics of the multi-wavelength photonic microwave phase shifter, the amplitude taper of the beam former can also be realised by controlling the optical attenuations to the laser output powers. The RF phase-shift over a range of RF frequencies from 10 GHz to 20 GHz was investigated for Ku-band antennas. Four RF phase shifters operating at optical wavelengths 1541.92nm, 1544.54nm, 1547.03nm, 1549.25nm were used in the investigation. FIG. 18 illustrates the output RF power of each phase shifter can be accurately reconfigured via programming optical attenuation. An attenuation control resolution of 0.1dB can be realized.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

We claim:

1. A beam forming antenna device emitting a predetermined free space energy pattern, the device including:
- an optical signal source having predetermined wavelength characteristics;
- an electro-optical intensity modulator performing electrical-to-optical conversion of an input microwave signal, for modulating predetermined wavelengths of the optical signal source to produce a modulated signal source including offsetted Radio Frequency (RF) upper and lower sideband components;
- a dispersion element for spreading and projecting the modulated signal source in a wavelength dependant manner onto a relative phase manipulation element, said relative phase manipulation element manipulating the relative phase between an optical carrier and its two RF sideband frequencies in a predetermined manner, and said phase manipulation element further amplitude modulating predetermined wavelengths of said modulated signal source and outputting a predetermined groupings of wavelengths on a series of output ports;
- optical to electrical conversion means converting the amplitude of the optical signal on said output ports to a corresponding electrical signal having the frequency of said input microwave signal; and
- a series of irradiating antenna elements connected to each corresponding electrical signal having the frequency of said input microwave signal for radiating a corresponding free space signal to substantially produce said predetermined free space energy pattern.

2. A device as claimed in claim 1, wherein said relative phase manipulation element comprises a liquid crystal array element having a two-dimensional array of independently controllable pixels for providing said relative phase manipulation.

3. A device as claimed in claim 1, wherein said phase manipulation element keeps the optical carrier unchanged and substantially attenuates the upper or lower side bands of said frequency sideband components.

4. A device as claimed in claim 1, wherein the groupings of said phase manipulation element are provided by means of a phase grating structure providing directional projection of predetermined frequencies to predetermined output ports.

5. A device as claimed in claim 1, wherein said relative phase manipulation element outputs differing portions of a single wavelength component to different output ports.

6. A beam forming antenna device emitting a plurality of predetermined directional free space energy patterns, the device including:
- an optical source emitting a series of optical signals at predetermined wavelengths;
- a series of electro-optical intensity modulators, performing electrical-to-optical conversion, having one of a series of Radio Frequency (RF) modulation inputs, said modulators, modulating the optical signals to produce a plurality of modulated output signals and their upper and lower sidebands;
- a wavelength processing unit, having a series of unit inputs and unit output, including:
  - a optical spreader system spreading said plurality of modulated output signals spatially by signal number and frequency onto a planar processing array;
  - a planar processing array, processing the spreaded series of signals, mapping each frequency of each signal to a predetermined output port with a predetermined phase relationship between optical carriers and their two RF sideband frequencies mapped to the same output port;
- for each output port:
- a demultiplexer for extracting and separating a series of frequency ranges from an output port producing a series of frequency specific demultiplexer outputs; and
- a series of conversion units, converting each of the frequency specific demultiplexer outputs to corresponding electrical signal having one of the frequencies of said input radio frequency signals;
- a series of emitters for emitting corresponding radiation patterns to the electrical signals, corresponding to said input radio frequency signals, so as to thereby produce said plurality of predetermined directional free space energy patterns.

7. A device as claimed in claim 6, wherein, for each output port, the corresponding electrical signals of each of said series of frequency ranges are combined and one emitter is provided for emitting the corresponding radiation pattern for each of the combined frequency ranges.

8. A device as claimed in claim 6, wherein each electro-optical intensity modulator modulates substantially all the predetermined wavelengths and said wavelength processing unit separates predetermined modulated wavelengths to output on predetermined output ports.

9. A method of forming a directionally focused electromagnetic radiation pattern, the method comprising the steps of:
- (a) inputting an optical input signal source having predetermined wavelength characteristics;
- (b) intensity modulating the optical input signal source with an input microwave signal to produce a modulated optical signal, including offsetted Radio Frequency (RF) upper and lower sideband components;
- (c) dispersing spatially the modulated optical signal in a wavelength dependant manner to produce a wavelength dispersed modulated signal;
- (d) manipulating the relative phase between a modulated carrier and its RF sidebands;
- (e) simultaneously mapping different portions of the phase manipulated dispersed modulated signal to one of a series of predetermined optical output signals;
- (f) for each optical output signal, converting the optical signal to a corresponding amplitude signal and applying the amplitude signal to an antenna element for transmission as said antenna output signal;
- whereby, in combination, the transmitted antenna output signals form said directionally focused electromagnetic radiation pattern.

10. A method as claimed in claim 9, wherein said step (e) further includes mapping different portions of a single wavelength to different optical output signals.

11. A method as claimed in claim 9 wherein said electromagnetic frequency source comprises a microwave frequency source.

12. A phase shifter device, the device including:

an optical signal source having predetermined wavelength characteristics;

an electro-optical intensity modulator, performing electrical-to-optical conversion of an input microwave signal, for modulating predetermined wavelengths of the optical signal source to produce a modulated signal source including frequency sideband components corresponding to said input microwave signal;

a dispersion element for spreading and projecting the modulated signal source in a wavelength dependant manner onto a relative phase manipulation element; and a relative phase manipulation element comprising a liquid crystal array element having a two-dimensional array of independently controllable pixels for providing said relative phase manipulation of the relative phase of the modulated signal source in a predetermined manner, said phase manipulation element further amplitude modulating predetermined wavelengths of said modulated signal source and outputting a predetermined groupings of wavelengths on a series of output ports.

13. A phase shifter device as claimed in claim 12, further comprising:

optical to electrical conversion means converting the amplitude of the optical signal on said output ports to a corresponding electrical signal; having the frequency of said input microwave signal.

14. A phase shifter device as claimed in claim 12, wherein the relative phase of the optical signal source and its frequency sideband components is set utilizing the relative phase manipulation element.

15. A phase shifter device as claimed in claim 1, wherein said phase shifting operates continuously from 0 to 2 $\pi$ at microwave frequencies.

* * * * *